April 21, 1936.  R. F. MACFARLANE  2,037,808
DISCHARGING MECHANISM FOR PANS OR TRAYS
Filed Nov. 10, 1934  3 Sheets-Sheet 1
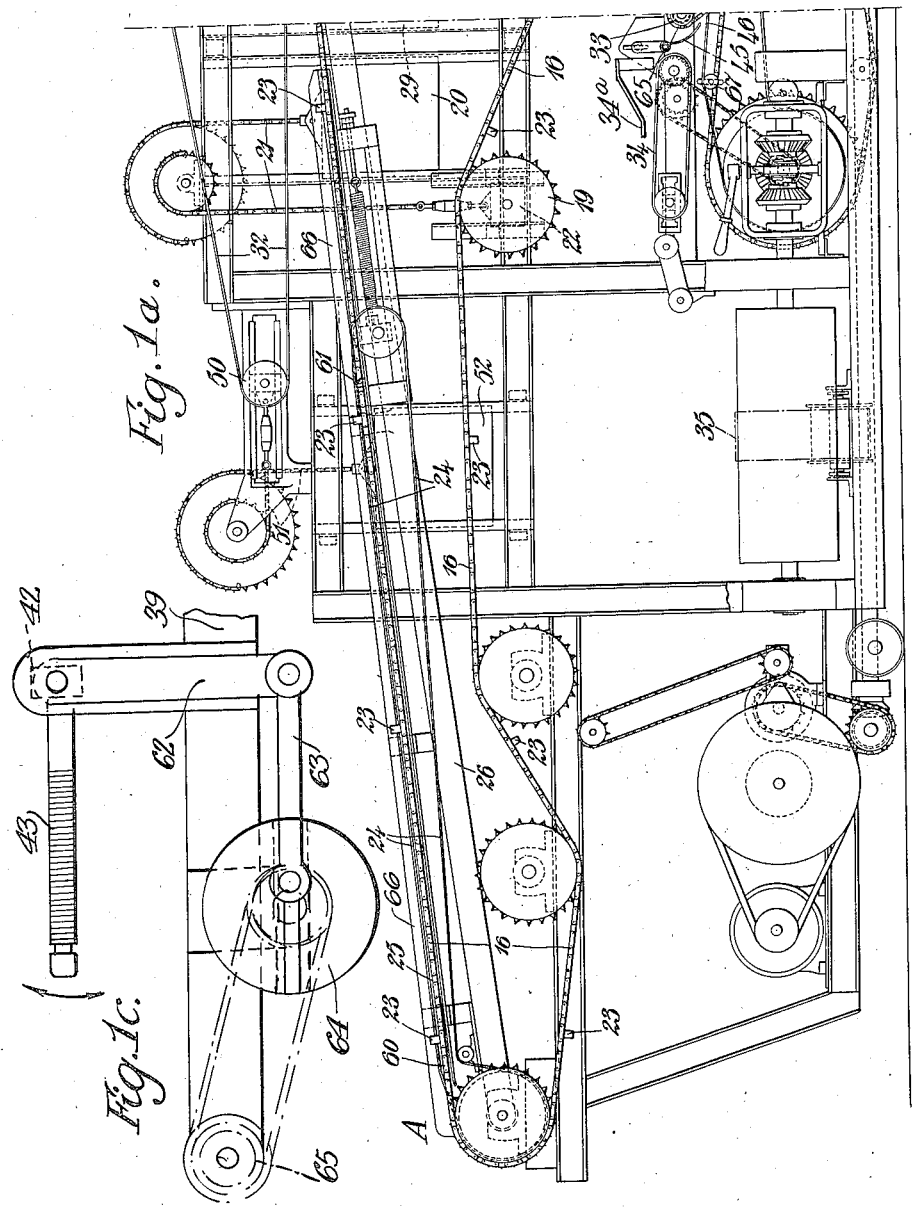

April 21, 1936.    R. F. MACFARLANE    2,037,808
DISCHARGING MECHANISM FOR PANS OR TRAYS
Filed Nov. 10, 1934    3 Sheets-Sheet 2

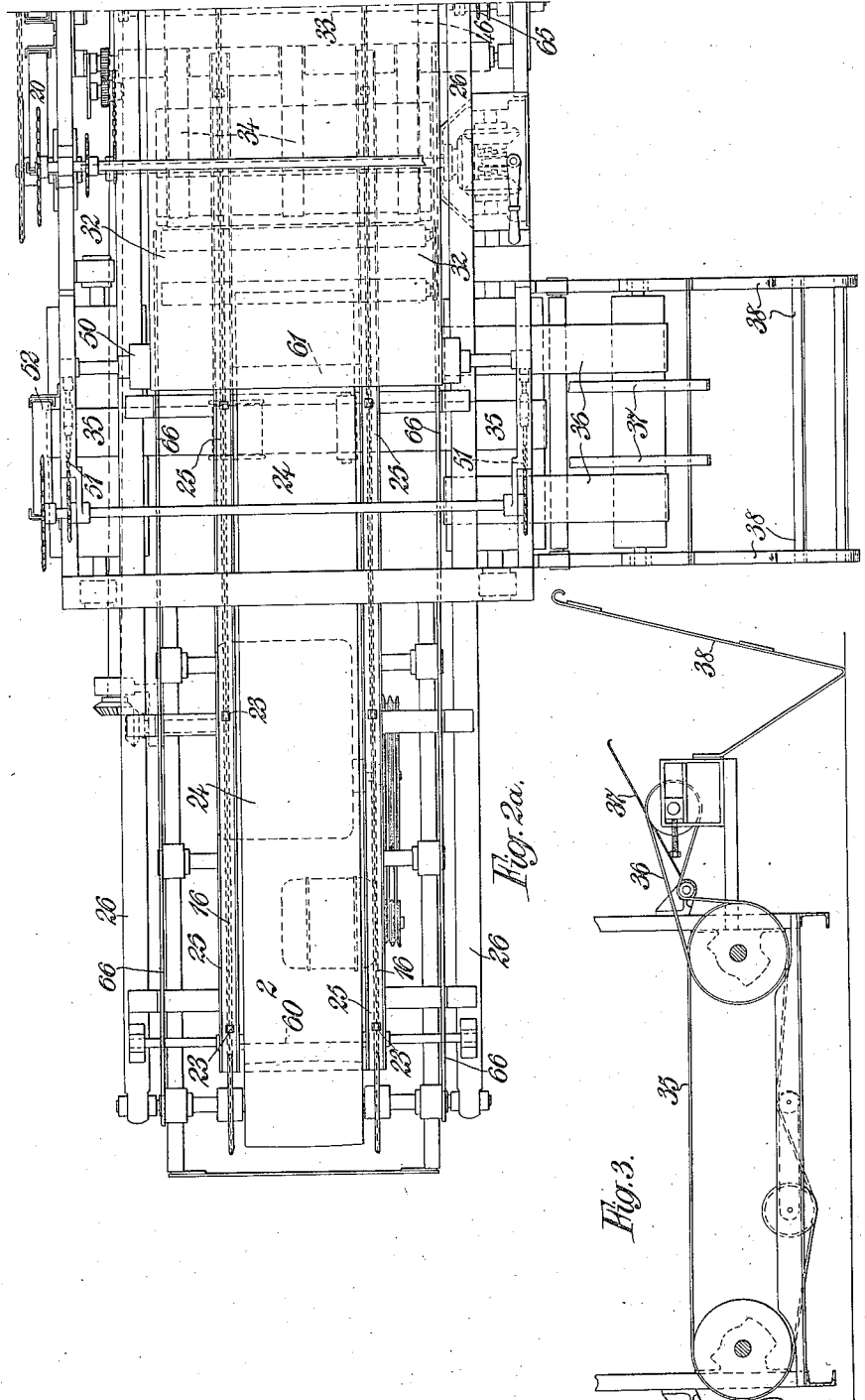

Patented Apr. 21, 1936

2,037,808

UNITED STATES PATENT OFFICE 2,037,808

DISCHARGING MECHANISM FOR PANS OR TRAYS

Robert French Macfarlane, Osterley, England, assignor to Baker Perkins Company Inc., Saginaw, Mich.

Application November 10, 1934, Serial No. 752,508
In Great Britain November 10, 1933

12 Claims. (Cl. 214—1.1)

This invention relates to means for discharging biscuits or like articles from loose wires, pans or trays on which the biscuits or the like have been baked or otherwise treated and also relates to associated operations such, for example, as the stacking of the discharged biscuits.

The invention has reference to a discharging operation involving the inversion of wires, pans or trays by the aid of means of the type comprising a square or polygonal roller, or a roller having a plurality of flat facets around its periphery operating in conjunction with a covering web to maintain the articles in position during the inversion period.

Although the invention may be applied to articles other than biscuits, for convenience the invention will be described hereinafter solely with reference to biscuits. The sheet metal pans used in the biscuit art are known as baking pans and will be hereinafter referred to as such and it is pointed out that the term "pan" is intended to include reticulated supports (such as are usually known in the biscuit art as "wires") for certain kinds of biscuits.

An aim of the invention is to provide apparatus for automatically discharging the contents of loose pans which may be separately fed by hand or otherwise to the apparatus.

A further object of the present invention is to adapt apparatus of the kind above referred to employing a square or polygonal roller for the inversion of loose pans and to provide means which besides enabling even the most delicate biscuits to be discharged in the same order as that in which they lie on the pan to facilitate subsequent stacking or collection, with a minimum of waste, also operate with such reliability as to require little supervision or attention.

The invention is also concerned with the delivery of the pans after they have been emptied of their contents in such a manner that their collection with their face surface upward is facilitated.

According to the invention the loose loaded pans from an oven or other source are placed by attendants on a feeding conveyor and are automatically registered to synchronize with the locating means on receiving facets of a square or polygonal roller around which the conveyor passes to deposit the pans thereon. As the roller revolves, the faces of the received pans and the biscuits thereon are enfolded by a close fitting covering web or apron during the period in which the pans are being inverted, and when the pans reach the inverted position the biscuits are deposited upon the covering web as it leaves the roller.

A feature of the invention comprises the provision of a pivotally mounted frame for supporting the feeding conveying means, such frame being oscillated in accordance with the variation in the radius of the polygonal roller as the latter rotates.

A further feature of the invention lies in the feeding conveyor means for the pans which comprise a belt conveyor and a pair of chains or like flexible elements, such as cables, carrying registration dogs or stops spaced at intervals corresponding to the distance (measured over the roller surface) separating the rear of locating means or receiving recesses on one facet of the roller from that on the next. The belt and chains follow separate paths and the chain runs at a speed only slightly faster than that of the belt, so that the dogs engage the pans without shock.

The invention further comprises the provision of:—a supporting path for the pans, as they leave the roller, slightly spaced from the covering web, this path being preferably constituted by troughing the web at its edges; rapping devices acting on the backs of the pans to free the biscuits therefrom while the pans are spaced from the web; a slightly downwardly inclined path to carry away and deposit the biscuits in reverse position on to a delivery conveyor below it and travelling in the opposite direction while preventing the forward portion of the pan damaging the biscuits as they tip over on to the delivery conveyor; and a receiving conveyor for the emptied pans inclined slightly downwardly to prevent the tails of the pans striking the biscuits.

Further features of the invention consist in discharging the emptied pans by a transverse conveyor and means such as resilient arms for turning the pans (as they leave the conveyor) face upward either in a position inclined to the vertical or horizontally in a stack.

The invention also consists in biscuit stacking means comprising long resilient or flexible weighted fingers which ride upon the biscuits as they are passed by the delivery conveyor on to a slower conveyor at a lower level to lay the biscuits thereon in overlapping or inclined stacked relation.

In the accompanying drawings,

Figures 1a and 1b are an elevation of a machine according to the invention,

Figure 1c is an enlarged detail view of the pan rapping device,

Figure 1B:
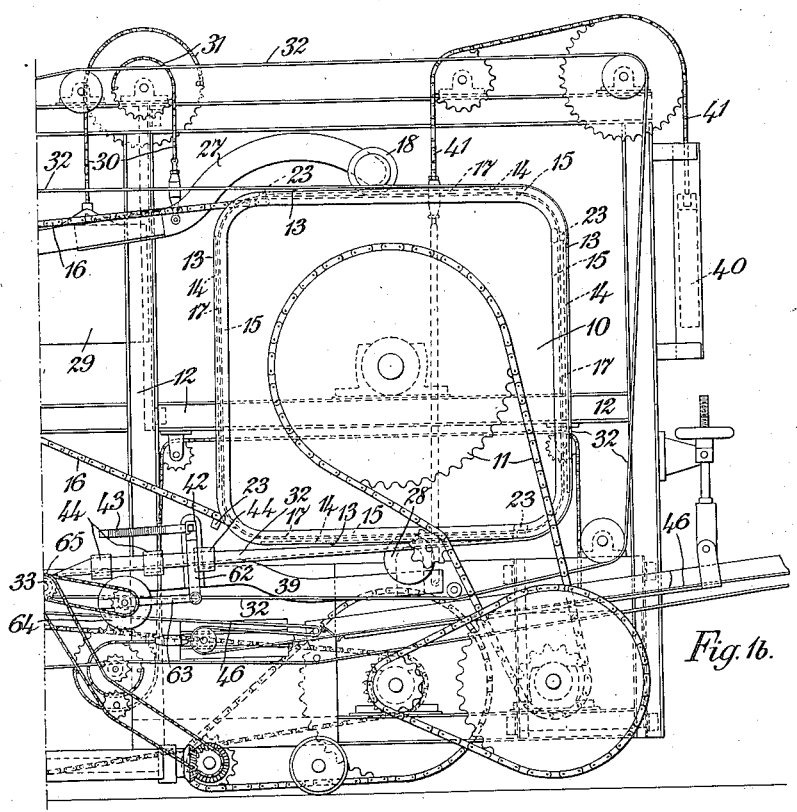
Figure 2B:
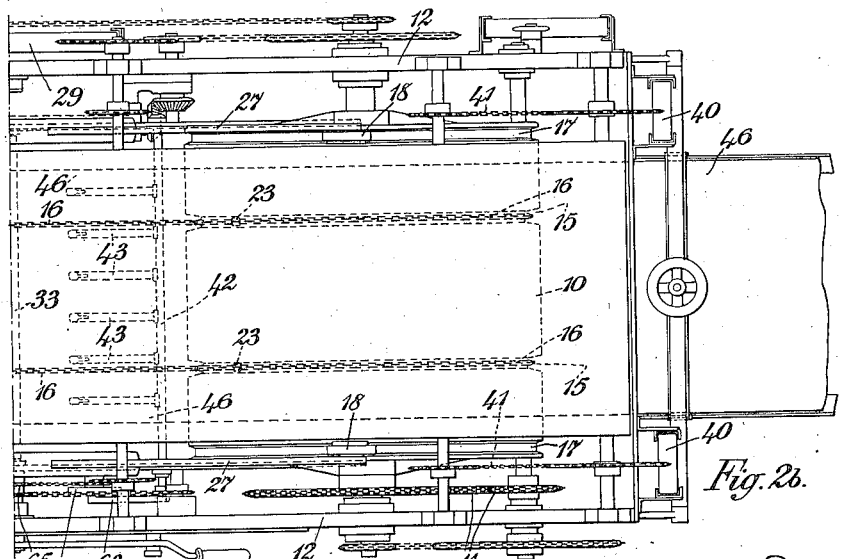

Figures 2a and 2b being a corresponding plan.

Figure 3 is a cross section showing details of the empty pan discharge.

In carrying the invention into effect according to one convenient mode as described by way of example, a square inverting roller 10, rotated by suitable driving means 11, is mounted in bearings in a suitable frame 12. The facets 13 of the roller are made with their longitudinal dimension somewhat greater than the width of the pans they are adapted to receive while their transverse or peripheral dimension is sufficient to accommodate the length of the pans. Each roller facet is provided with a recess 14 corresponding with the shape and dimensions of the pan and of a depth such that the pan surface or the tops of the biscuits lies practically flush with or slightly proud of the surface of the facets. The facets and/or recesses may be covered with upholstery or padding to take care of bulged pans or wires and further to ensure a snug clamping by the covering web referred to below.

Peripheral grooves 15 are formed in the facets of the roller for the reception of the chain 16 of a feeding chain conveyor for the pans. These grooves may be provided with teeth for meshing with the links of the chains or certain of them. Oscillating frames are provided as will be hereinafter described which are moved in synchronism with the rotation of the roller by cams to accommodate certain bands or conveyors with the irregularity caused by the difference in radius of the corners and facets of the roller 10. It is convenient to form these cams on the roller itself and to this end it is provided with tracks or grooves 17 (preferably of arcuate cross section) around the roller toward each end thereof in which riders, such as rollers 18, 28 or shoes engage to impart the required oscillation to the frames.

The pair of endless pan conveyor chains 16 leads up a ramp, from a feeding station A, at a convenient height, over and around the inverting roller 10, whereon they are located in the grooves 15, above mentioned, under the roller and back to the receiving station by a convenient path. The alternate slack and tension of the return lap of the chain conveyor is accommodated by a jockey roller 19, which may be either spring-controlled or counterweighted by a sliding weight 20, guided in the framework and connected through the chains 21 to the bearing 22 for the pulley.

Each chain 16 is provided with a series of dogs 23, the intervals between which correspond with the linear distance measured around the roller 10 between the rear edge of the pan recess 14 in one facet of the roller and the rear edge of the recess of the next facet.

Co-operating with the chains 16 and in the space between them, a conveyor band 24, travelling at a slightly slower rate than the chains, is mounted and extends over the whole or a portion of the ramp referred to above. The conveyor band 24 is supported in a position elevated slightly above the chains by bars 60, 61 but below the dogs 23. The pans are laid on this elevated portion of the band 24 which proceeds to carry them forward and lay them gently on the chains 16. As the chains are travelling somewhat faster than the pan-receiving band 24, the dogs slowly catch up the pans without shock. Side fences 66 locate the pan laterally of the conveyor 24.

In order to avoid free swinging or vibration of the chain 16 and pans as they proceed up the ramp at an angle varying with the alternate arrival of facet and corner of the roller 10 at the uppermost position and in order to support the chains in their path, rails or slide channels 25 are mounted upon a frame 26 which is hinged adjacent the feeding station. The upper end of the frame has arms 27, which carry the rollers 18, or shoes above referred to for engaging the cam grooves 17 upon the roller 10. The weight of the ramp oscillating frame 26 upon the cam surfaces may be relieved by counterweights 29 sliding in the framework and connected to the frame by chains 30 passing over the wheels 31. As the facets arrive at the upper horizontal position the pans are deposited by the chains 16 in the receiving recesses 14 while the chains run into the grooves 15 on the roller.

The roller 10 is provided with a covering or wrapping endless web or apron 32, one lap of which contacts closely with the roller so that the pans as they are turned downwardly by the rotation of the roller are covered by the web and the biscuits are maintained in position. The effect of the variation of the diameter of the square roller 10 upon the apron 32 is accommodated by a sliding jockey pulley 50 around which the apron passes and which is connected by chains 51 with the counterweight 52. As the pans reach their lower horizontal inverted position the web 32 leaves the roller and is guided on a slightly downwardly inclined path for a short distance sufficient to receive the biscuits from each pan as it is liberated from the roller. This length of the web is given a further decline where it is about to enter its return lap around a terminal roller 33 for the discharge of the biscuits in reversed position. Opposite and slightly higher than the return roller 33 another conveyor 34 is provided for receiving emptied pans and depositing them upon a transverse conveyor 35 adapted to discharge the pans for collection. The emptied pans as they pass over the receiving conveyor 34 may be held down and controlled by spring fingers 34a in order to prevent any tendency of the tail of the pan to tip downwardly in transit and so avoids any possibility of the back parts of the pan tapping or engaging the biscuits as they reverse over the terminal roller 33 of the covering web. As is shown in Fig. 3, the transverse delivery conveyor 35 feeds the emptied pans on to a pair of bands 36 and over a pair of inclined spring arms 37, the inclination and length of which is such as to cause inversion of the pan so that its face is inclined upward and stacked against an inclined back board 38, or the arrangement may be such that it falls to form a horizontal stack.

Means for supporting the underside of the covering web 32 after it leaves the inverting roller 10 may be provided and carried by an oscillating frame similar to that already described for the ramp conveyor and pivoted coaxially with or adjacent the terminal roller 33. This frame is conveniently formed with a pair of side bars 39, which carry the rollers 28, engaging the grooves 17 on the roller, the rollers being kept in contact with the cam grooves by springs or counterweights 40 connected to the bars 39 by chains 41.

The oscillating frame 39 carries a device adapted to tap the back of the pans so that the tapping effect is constant irrespective of the oscillation of the web and pans. For example, the oscillating frame may carry a pivoted transverse bar 42 on which a series of resilient weight fingers 43 are provided, this bar being oscillated by cam or other means to cause the fingers to give a gentle rapping action on the backs of the pans to free any biscuits which may be still adhering to the pan surface.

According to a convenient arrangement the bar 42 has rigidly connected thereto an arm 62 which is coupled to a link 63, the other end of which is adjustably secured to a crank disc 64 carried by the frame 39 and driven from a chain wheel 65 coaxial with the terminal roller 33. The wheel 65 is driven from a suitable part, a clutch being provided whereby the rapping device may be cut out if desired.

In order to cause the pans after they reach the inverted position and are received on the web to separate slightly therefrom, the margins of the web are troughed by transversely curved guiding means 44 or coned rollers. Upon these margins the lateral edges of the pans rest so that they follow a path slightly spaced from that of the central biscuit-receiving portion of the web. This arrangement is for the purpose of avoiding breakage by preventing the rapping effect taking place upon the backs of the pans and biscuits whilst supported by the web.

The freed biscuits subside (with their backs uppermost) upon the web and pass down the final decline over the web terminal roller 33. This roller operates in conjunction with an inclined or curved guide plate or fingers 45 adapted to assist in inverting the biscuits as they tip downwardly in passing over the terminal roller. The biscuits as they are reversed are received by a delivery conveyor 46 moving in the opposite direction to the lap of the covering web 32 on which the biscuits are received. The receiving end of the delivery conveyor is adjustable as to height by raising or lowering a guide pulley 67 in order to accommodate biscuits of various sizes. This conveyor passes the received biscuits (now face uppermost) below and past the position of the inverting roller and to a stacking or collecting station. It is preferred that the biscuits travel first up a slight incline to a crest and then upon a slight decline to an edge over which the delivery conveyor passes to its return lap. This edge delivers the biscuits on to a collecting conveyor travelling at a slower speed than the delivery conveyor so that the biscuits as they are fed from the edge of the delivery conveyor are arranged in overlapping relation or what may be called an inclined stack which facilitates collection by hand.

In order that the biscuits are controlled and protruded outwardly without undue tipping from the edge of the delivery conveyor, a transverse series of fingers are provided, such as the fingers 41 referred to in my copending application Serial No. 752,507. These fingers are in the form of very long resilient tongues which lightly press upon the biscuits and prevent the front edge of biscuits dropping too early. Alternatively, the fingers may be formed by long flexible strips of metal having on the upper sides of their ends small weights so that the fingers are caused to ride gently but firmly over the biscuits and counterbalance any tendency to tip.

While in its preferred form the invention utilizes a square roller for inverting the trays, it will be appreciated that a triangular roller or a roller having more than four facets may be employed, such being included within the phrase "polygonal roller".

I claim:

1. A machine for discharging biscuits from loose pans, comprising a rotatable roller having on its periphery flat pan-receiving facets, a flexible apron embracing the roller and the pans thereon, and arranged and adapted to move with said roller and to thereby invert said pans and biscuits, take-up means for said apron, a feeding conveyor around the roller and underneath the apron and pans, and registering means, spaced on the conveyor and adapted to engage the pans and position them in register with the facets of the roller.

2. A structure as set forth in claim 1 wherein a movable supporting frame for the feeding lap of said conveyor is pivoted to a fixed support remote from the roller, the free end of said frame operatively engaging said roller and adapted to oscillate in accordance with the variations of radius of the roller.

3. A machine for discharging biscuits from loose pans, as claimed in claim 1, wherein a frame is hinged to a fixed support remote from the roller, the free end of the frame being provided with a rider, and a peripheral groove in said roller receiving said rider.

4. A structure as claimed in claim 1 having a ramp, dogs on the feeding conveyor, pan-receiving recesses in the facets of the roller in register with said dogs, a band associated with the ramp portion of said feeding conveyor and traveling in the same direction, at a rate slower than said dogs, the delivery end of said band being slightly lower than the said ramp, and means, actuated by said roller, arranged and operative to oscillate the delivery end of said feeding conveyor.

5. A structure as claimed in claim 1 having a ramp, dogs on the feeding conveyor in register with pan-receiving recesses formed in the facets of the roller, and a band associated with the ramp portion of said feeding conveyor, said band traveling at a rate slower than said dogs.

6. A machine for discharging biscuits from loose pans, as claimed in claim 1, having a supporting roller for the delivery portion of said apron, a frame hinged to a fixed support adjacent said roller, means for oscillating the free end of said frame in accordance with the variations of the radius of the roller, and pan-rapping means carried by said frame intermediate its ends.

7. A machine for discharging biscuits from loose pans as claimed in claim 1, having a supporting roller of non-circular shape carrying the delivery portion of said apron, a frame hinged to a fixed support, means for oscillating the free end of said frame in accordance with the variations of the radius of the roller, and apron troughing means on said oscillatable frame, arranged and adapted to separate emptied pans from the central biscuit-carrying portion of the apron.

8. In a machine as claimed in claim 1, including a support for the delivery portion of said apron, a frame hinged to a fixed support and extending to the roller, means for oscillating the end of the frame adjacent the roller in accordance with the variations of the radius of the roller, pan-rapping means carried by said frame, comprising spring fingers carried by a transverse bar mounted on said frame, and means for actuating said fingers, and troughing means for said apron mounted on said frame adjacent said rapping means.

9. A machine for discharging biscuits from loose pans as claimed in claim 1, having a supporting roller for the delivery portion of said apron, a frame hinged to a fixed support co-axial with the supporting roller, means for oscillating the free end of said frame in accordance with the variations of the said facet-carrying roller, and rearwardly directed guides adjacent said delivery roller, said guides being arranged and adapted to engage and reverse the biscuits as they leave the apron and to direct them rearwardly.

10. Means for inverting biscuit-laden pans comprising a revolving drum having on its periphery a plurality of uniformly spaced flat facets formed with recesses to receive said pans, means arranged and adapted to insert pans in said recesses, in regular order, during the rotation of said drum, an endless flexible traveling apron embracing the greater part of the periphery of said drum and overlying the biscuits on said pans in a manner to hold them in place on the pans during rotation of the drum, the delivery run of said apron constituting a support and carrier for the biscuits and for the inverted pans on said biscuits.

11. A structure as set forth in claim 10 wherein there is operatively associated with the said delivery run means for loosening the biscuits from the inverted pans, means for separating the biscuits from the pans, means for removing the pans from the apron, and means for discharging the freed biscuits in inverted position from the apron.

12. In combination with a rotatable drum having facets uniformly spaced around its periphery in substantially polygonal formation, a flexible traveling apron embracing the pan-receiving facets of the drum, means for placing biscuit-laden pans on said facets in regular order during the movement of the drum and apron, said means comprising a pan conveyor engaging that part of the periphery of the drum embraced by said apron, a run of said conveyor extending to a loading station remote from the drum, said run constituting an oscillatable ramp, and dogs on said conveyor adapted to receive pans of biscuits between them and so arranged in relation to the conveyor and drum as to deposit said biscuit-laden pans on said drum, underneath said apron, and in register with said pan-receiving facets.

ROBERT FRENCH MACFARLANE.